United States Patent
Faulkner

(10) Patent No.: US 10,776,933 B2
(45) Date of Patent: Sep. 15, 2020

(54) ENHANCED TECHNIQUES FOR TRACKING THE MOVEMENT OF REAL-WORLD OBJECTS FOR IMPROVED POSITIONING OF VIRTUAL OBJECTS

(71) Applicant: MICROSOFT TECHNOLOGY LICENSING, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 16/212,575

(22) Filed: Dec. 6, 2018

(65) Prior Publication Data

US 2020/0184653 A1   Jun. 11, 2020

(51) Int. Cl.
*G06T 19/00*   (2011.01)
*G06T 7/246*   (2017.01)
*G06T 7/73*    (2017.01)
*G06T 7/90*    (2017.01)
*G06T 7/62*    (2017.01)
(Continued)

(52) U.S. Cl.
CPC .......... *G06T 7/248* (2017.01); *G06K 9/00201* (2013.01); *G06T 7/40* (2013.01); *G06T 7/62* (2017.01); *G06T 7/74* (2017.01); *G06T 7/90* (2017.01); *G06T 19/006* (2013.01); *G06T 2207/10028* (2013.01)

(58) Field of Classification Search
None
See application file for complete search history.

(56) References Cited

U.S. PATENT DOCUMENTS

| | | |
|---|---|---|
| 9,041,739 B2 | 5/2015 | Latta et al. |
| 9,122,321 B2 | 9/2015 | Perez et al. |
| 9,215,293 B2 | 12/2015 | Miller |

(Continued)

OTHER PUBLICATIONS

Martinez, Eduardo Munoz, "Real-time Surface Reconstruction and Interaction for Mixed Reality", In Dissertation of University of Dublin in fulfillment of the requirements for the Degree of Master of Science in Computer Science, Sep. 2017, 70 Pages.

(Continued)

*Primary Examiner* — Vikkram Bali
(74) *Attorney, Agent, or Firm* — Newport IP, LLC; Scott Y. Shigeta

(57) ABSTRACT

This disclosure provides enhanced techniques for tracking the movement of real-world objects for improved display of virtual objects that are associated with the real-world objects. A first device can track the position of a real-world object. When the real-world object moves out of a viewing area of the first device, a second device can use metadata defining physical characteristics of the real-world object shared by the first device to identify the real-world object as the real-world object comes into a viewing area of the second device. The second device can then maintain an association between the real-world object and the virtual objects as the real-world object moves, and share such information with other computers to enable the other computers to display the virtual objects in association with the real-world object even though they are not in direct view of an associated real-world object.

20 Claims, 13 Drawing Sheets

(51) Int. Cl.
  *G06T 7/40* (2017.01)
  *G06K 9/00* (2006.01)

(56) References Cited

U.S. PATENT DOCUMENTS

| | | | |
|---|---|---|---|
| 9,645,394 B2 | 5/2017 | Kinnebrew et al. | |
| 10,007,413 B2* | 6/2018 | Hill | G06F 3/013 |
| 10,132,633 B2* | 11/2018 | Liu | G06F 3/011 |
| 2012/0249741 A1 | 10/2012 | Maciocci et al. | |
| 2016/0026253 A1* | 1/2016 | Bradski | H04N 13/344 |
| | | | 345/8 |
| 2016/0210784 A1 | 7/2016 | Ramsby et al. | |

OTHER PUBLICATIONS

Sankaranarayanan, et al., "Object Detection, Tracking and Recognition for Multiple Smart Cameras", In Proceedings of IEEE, vol. 96, Issue 10, Oct. 17, 2008, pp. 1606-1624.
Starner, et al., "Computer Vision-Based Gesture Tracking, Object Tracking, and 3D Reconstruction for Augmented Desks", In Machine Vision and Applications, vol. 14, Issue 1, Apr. 1, 2003, pp. 1-13.
Wang, et al., "Cooperative Object Tracking and Event Detection with Wireless Smart Cameras", In Proceedings of Sixth IEEE International Conference on Advanced Video and Signal Based Surveillance, Sep. 2, 2009, pp. 394-399.
"International Search Report and Written Opinion Issued in PCT Application No. PCT/US19/063829", dated Feb. 25, 2020, 14 Pages.

* cited by examiner

ENHANCED TECHNIQUES FOR TRACKING THE MOVEMENT OF REAL-WORLD OBJECTS FOR IMPROVED POSITIONING OF VIRTUAL OBJECTS

BACKGROUND

A mixed-reality display presents computer-generated virtual objects that can "augment" the view of a real-world environment surrounding a user. For instance, a user can place a three-dimensional virtual item, such as a cup, to appear as if the virtual item is positioned on a real-world, "physical" object, such as a table.

Although some existing computing devices allow users to position virtual objects on or near physical objects in a real-world environment, features that enable users to interact with such virtual objects can be limiting. For instance, in the above-described example involving the virtual cup that is positioned to appear on the real-world table, not all systems can manage the relationship between the cup and the table when the table is moved. When a particular device, such as a head-mounted device, is used to track the movement of the table, a number of errors can occur when the table is moved out of the view of the head-mounted device. In this scenario, the virtual object can become disassociated from the real-world object, and a computer may lose its ability to display the virtual object with the right orientation or at the right position. Such a result can completely undermine the purpose of a mixed-reality environment, which is to position items in a precise manner to augment a real-world view. Such issues are exacerbated when the mixed-reality environment is displayed during a communication session, such as a live meeting or a communication broadcast to many users.

SUMMARY

This disclosure provides enhanced techniques for tracking the movement of real-world objects for improved positioning of virtual objects shared within a collaborative environment. This disclosure provides at least two improvements to existing systems. In a first aspect, the present disclosure enables a device to utilize sensors of remote devices to track the position of a real-world object that has moved out of a viewing area of the device. When a real-world object moves out of a viewing area of a first device, a second device can use data shared by the first device to identify the real-world object as the object comes into a viewing area of the second device. The shared data can describe physical characteristics of the real-world object and also define any associated virtual object. The second device can then maintain an association between the real-world object and the associated virtual objects, even when the real-world object has moved out of the viewing area of the first device. Such techniques can expand the coverage area for devices that are tracking the movement of real-world objects.

In another aspect, by storing the shared data in a persistent manner, a system can maintain an association between a real-world object and a virtual object between different communication sessions, e.g., online meetings or broadcasts. For example, in a group communication session using Skype, a first device can determine physical characteristics of real-world objects. Data defining the physical characteristics and other data defining virtual objects can be stored during or upon the conclusion of the communication session. When a new communication session is instantiated, e.g., a private chat, a device can use the stored data to identify a real-world object matching the physical characteristics and then display associated virtual objects that were created in the previous communication session.

The techniques disclosed herein provide a number of features that improve existing computers. For instance, computing resources such as processor cycles, memory, network bandwidth, and power, are used more efficiently since computers can track the location of one or more objects without requiring user input. The reduction of user input can reduce the likelihood of inadvertent entries and other related errors, which cause inefficiencies with respect to user productivity and the use of computing resources for such entries and corrections to inadvertent entries. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, networked appliances, and the others. Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
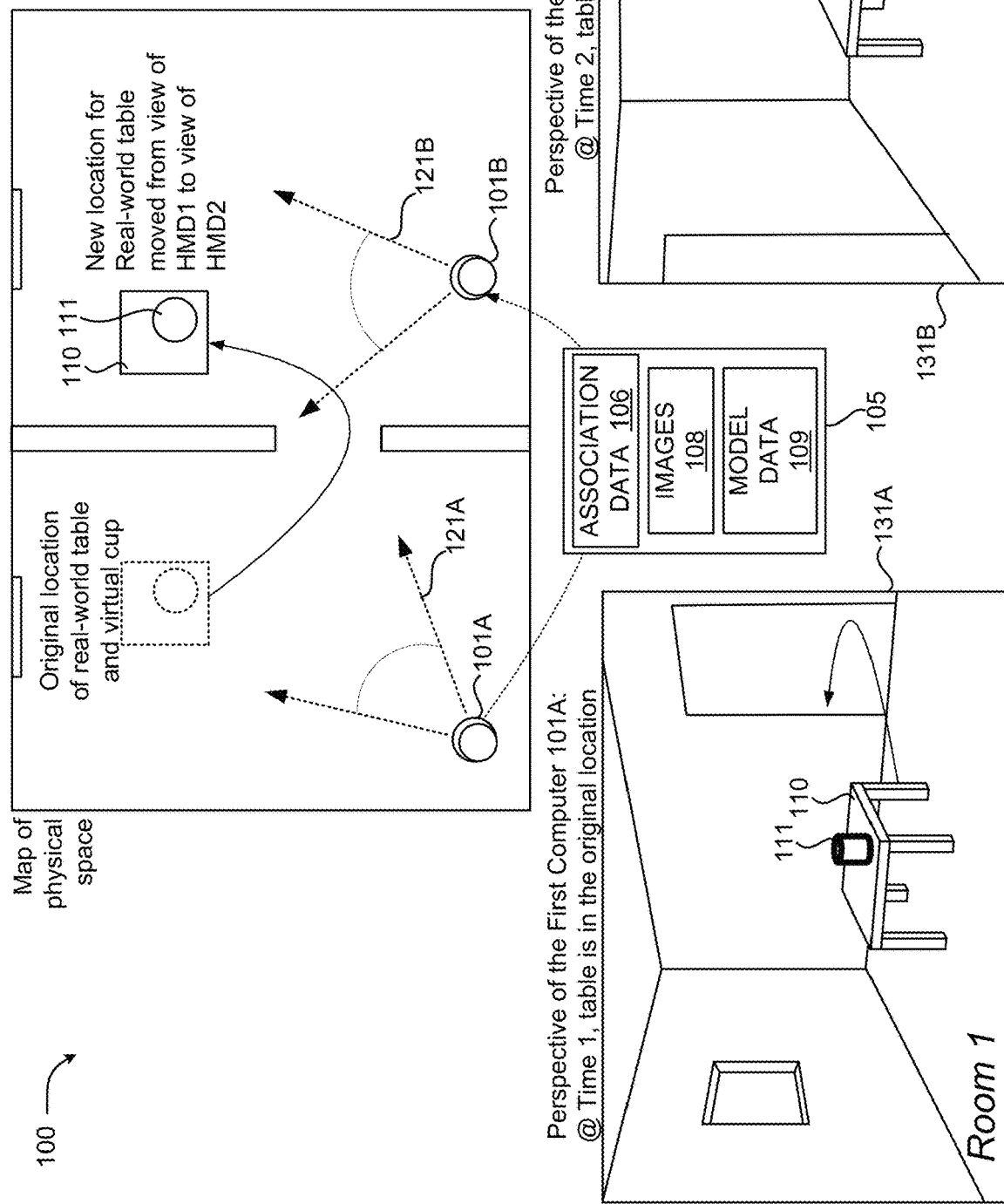
FIG. 1 illustrates an example scenario involving a computing system that can be utilized to implement the techniques disclosed herein.

FIG. 1 illustrates an example scenario involving a computing system 100 that can be utilized to implement the techniques disclosed herein. The computing system 100 can include a first computer 101A and a second computer 101B. In this scenario, a first computing device 101 records aspects of a real-world object 110 that is within the viewing area 121A of the first computing device 101A. In this illustrative example, the real-world object 110, is a table. One or more sensors can be used to measure and record metadata 105 defining characteristics of the table, such as the table dimensions, color, texture, position, etc.

The first computing device 101A can also associate a virtual object 111 with the real-world object 110 and generate association data 106 defining a number of associations between the virtual object 111 and the real-world object 110. For instance, the association data 106 can define positions of the virtual object 111 and the real-world object 110. The data defining the positions can be used to define relative positions, e.g., differences between the positions of each item. Other metadata 105 can also define associations between the virtual object 111 and the real-world object 110. For instance, image data 108 (also referred to herein as "images 108") can be generated by an imaging device, e.g., a camera, and the image data 108 can be utilized by one or more computing devices 101 to identify and generate data defining a graphical association between the two items, e.g., that one object is positioned on top of another item, beside another item, etc. For illustrative purposes, the term "object" and "item" can refer to either a real-world object or a virtual object.

The first computing device 101A can also render the virtual object 111 by the use of model data 109 defining parameters, e.g., a size, shape, texture, or color, of the virtual object 111. The virtual object 111 can be rendered in a specific position relative to the real-world object 110. As shown, the virtual object 111, which in this example is a cup, is positioned to give the appearance that the virtual object 111 is placed on the top surface of the real-world object 110, the table. This example is provided for illustrative purposes and is not to be construed as limiting. Any virtual object 111 and any real-world object 110 can be utilized by the techniques disclosed herein and displayed in any relative position with respect to one another.

One or more sensors of the computing device 101A can be used to track the movement of the real-world object 110 and modify the position of the virtual object 111 according a new position of the real-world object 110. Thus, if the table is moved in a particular direction, the position of the cup follows the movement of the table to maintain the graphical association between the two items, e.g., that the cup is on top of the table.

The techniques disclosed herein enable multiple computing devices to track the movement of the real-world object 110 even when a particular real-world object 110 is outside of, e.g., no longer within, the viewing area of a particular computer. With reference to FIG. 1, consider an example scenario where the real-world object, the table, is moved from the first room ("Room 1") to a second room ("Room 2"). In such a scenario, when the real-world object 110 is moved from the viewing area 121A of the first computing device 101A to a new location outside of the viewing area 121A of the first computing device 101A, the first computing device 101A can coordinate with a second computing device 101B to continue to track the movement of the real-world object 110. To facilitate the coordination, metadata 105 comprising association data 106, one or more images 108 of the objects, and/or model data 109 is communicated from the first computing device 101A to the second computing device 101B. In some embodiments, the metadata 105 can define one or more characteristics of the real-world object that are detected by the first computing device 101A. As will be described in more detail below, the association data 106 can define associations between virtual objects and real-world objects, and positions of the virtual objects and real-world objects. The model data 109 can define virtual objects to be displayed concurrently with a display of a real-world object.

The second computing device 101B can then utilize the metadata 105 to identify the real-world object 110, e.g., the table, within the viewing area 121B of the second computing device 101B. In one illustrative example, physical characteristics of the real-world object 110, such as a size, one or more dimensions, texture, color, and/or a shape, can be measured by the second computing device 101B. Any measurements detected from a sensor directed towards the relocated real-world object 110 can be utilized to determine that the real-world object within the viewing area 121B of the second computing device 101B is the same real-world object that was viewed by the first computing device 101A.

A particular real-world object viewed by the second computing device 101B can be determined to be a match with a real-world object viewed by the first computing device 101A if measurements generated by each computer are determined to be within a threshold difference. In some configurations, a confidence score can be determined based on a difference between measurements collected by both computing devices. For example, the first computing device 101A can determine that a table in its corresponding viewing area 121A is 15.1 inches high, and the second computing device 101B can determine that a table in its corresponding viewing area 121B is 14 inches high. If the two measurements are within a threshold difference, the one or more computing devices can determine that the two measured perspectives match.

In some embodiments, the confidence score may be generated based on the two measurements of each device combined. This confidence score can be combined with other confidence scores, e.g., confidence scores with respect to differences in color, shape, and/or other physical properties, and the combination of confidence scores can be compared to a threshold. If the combined confidence scores exceed the threshold, a match can be determined.

A confidence score may also be based on a position of an object detected by each computing device. In one illustrative example, consider a scenario where the first computing device 101A generates data indicating a last-known position of a real-world object. Then, after the object is moved, the second computing device 101B detects the presence of the real-world object and generates data indicating the first-known position of the object. A confidence score may be generated based on the distance between the last known position of the first computing device and the first-known position of the second computing device. If the confidence score exceeds a threshold, a match can be determined.

Once the real-world object is identified by the second computing device 101B, e.g., that a match is determined, the metadata 105 can be utilized to render the virtual object 111 in a graphical position that is consistent with any association detected by the first computing device 101A. For instance, as shown in FIG. 1, the virtual object 111 can be displayed by the second computing device 101B, where the position of the virtual object 111 relative to the real-world object 110 is similar to the arrangement detected by the first computing device 101A.

A first perspective view 131A displayed to a user of the first computing device 101A illustrates a view at a first time ("time 1") before the table is moved from room 1 to room 2. A second perspective view 131B displayed to a user of the second computing device 101B illustrates a view at a second time ("time 2") after the table is moved from room 1 to room 2. As shown in FIG. 1, in this example, the second computing device 101B renders the cup on the right-hand side of the top of the table near the right front leg, a position that is similar to the display shown at the first computer 101A.

Figure 2:
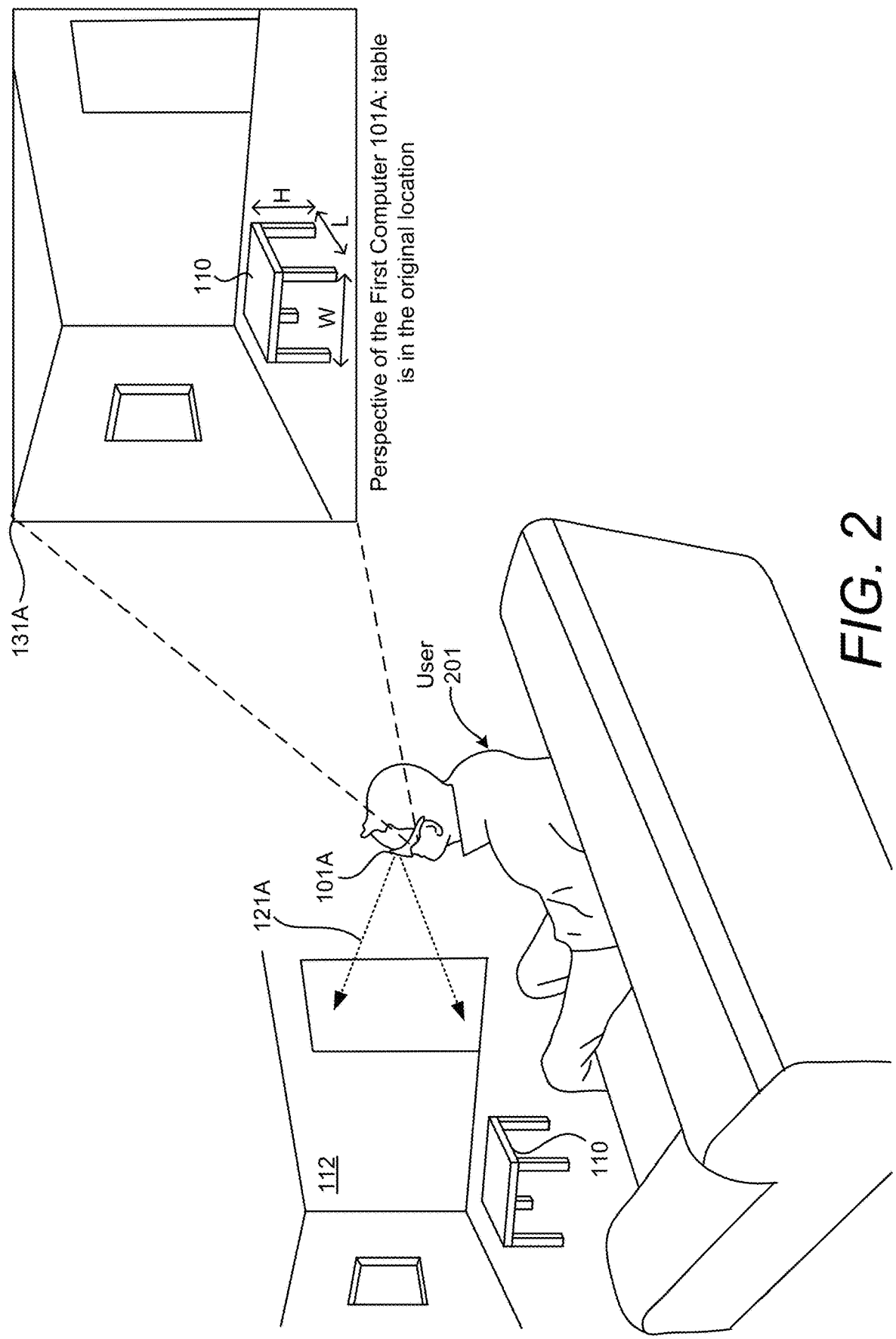
FIG. 2 illustrates a view displayed to a user utilizing a computing device for detecting characteristics of a real-world object in a real-world environment.

FIG. 2 illustrates a view of a user 201 utilizing the first computing device 101A. as shown, the first computing device 101 has a viewing area 121A that is directed to a real-world environment 112, e.g., a room with one or more real-world objects 110. One or more sensors can be used to generate data defining an image of the real-world environment 112. By the use of one or more display devices of the first computing device 101A, the user 201 can view the first perspective view 131A.

Depth map data (also referred to herein as "mesh data") can be generated by one or more sensors of the first computing device 101A. For instance, depth map sensors and/or cameras, can be used to determine coordinates of various points of a surface of a real-world object. Based on these coordinates, measurements can be generated, such as a height (H), width (W), and length (L), of a real-world object 110, such as the table. These measurements and other measurements defining one more characteristics can be shared with one or more devices to allow other devices to identify the real-world object 110 if the real-world object moves to a location outside of the viewing area 121A of the first computing device 101A and into a viewing area of the other devices. The depth map data can be stored within the association data 106 or stored within separate package of metadata 105.

Figure 3:
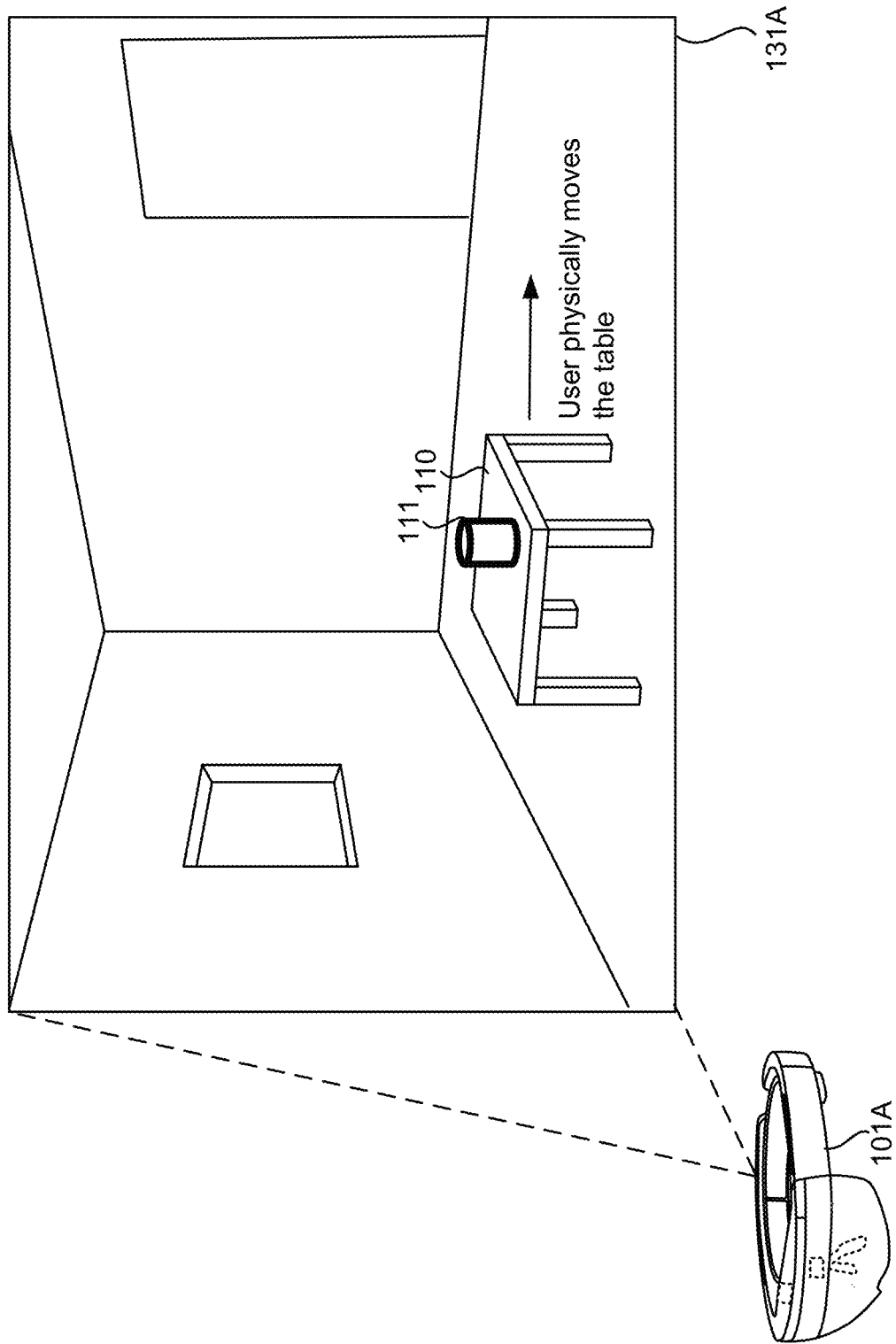
FIG. 3 illustrates a view displayed to a user utilizing a computing device for tracking the movement of a real-world object from a first position in a real-world environment.

Referring now to FIGS. 3-9, the following description illustrates several stages of a tracking process through the viewing perspective 131 of each computing device 101. As shown in FIG. 3, the first computing device 101A can detect a position of a real-world object 110, e.g., the table, at a first position within a real-world environment, e.g., Room 1. In this example, the first computing device receives model data defining a virtual object 111, e.g., a cup, which is positioned such that it appears to be on top of the table.

Figure 4:
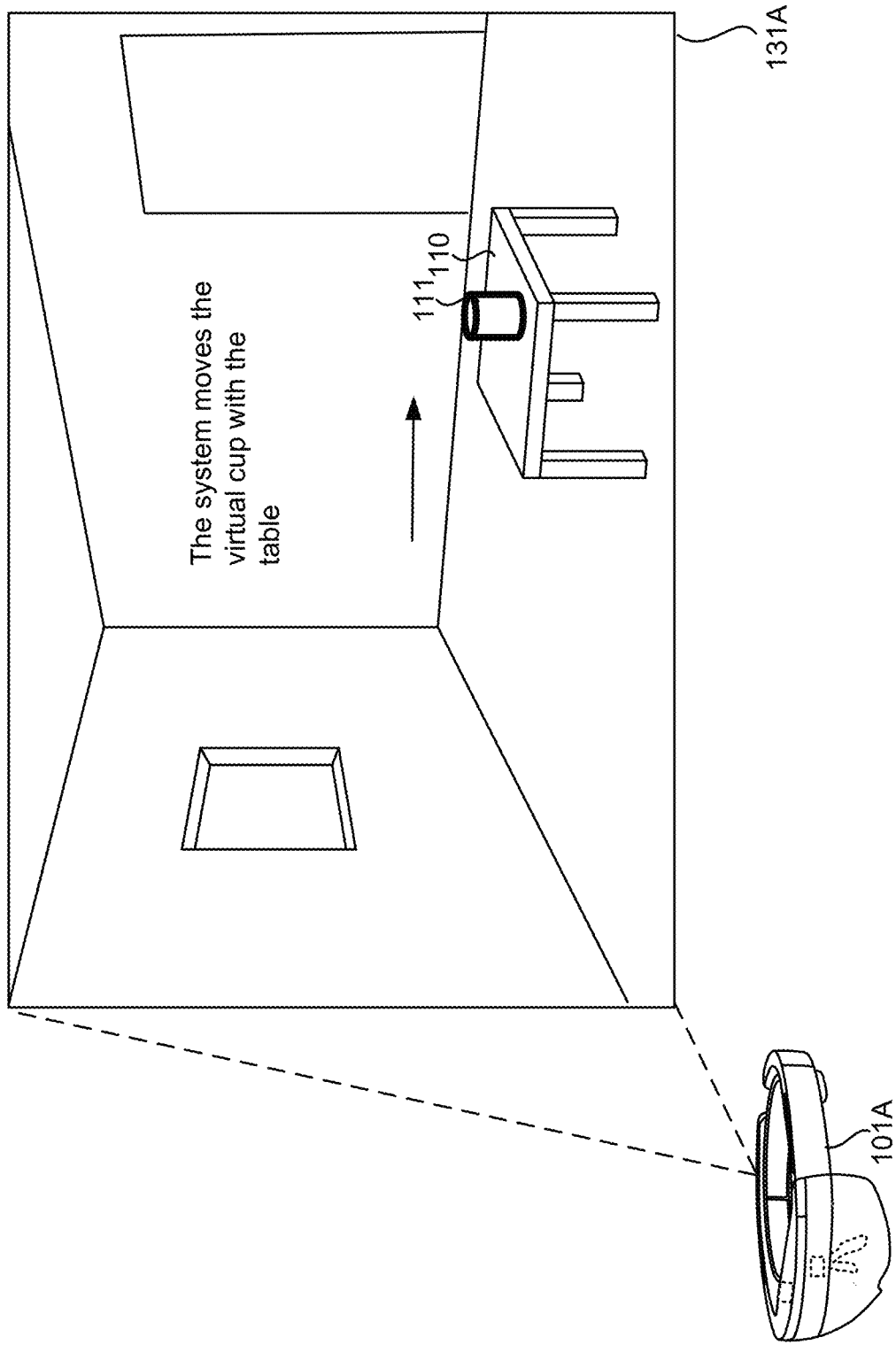
FIG. 4 illustrates a view displayed to a user utilizing a computing device for tracking the movement of a real-world object to a second room position in a real-world environment.
Figure 5:
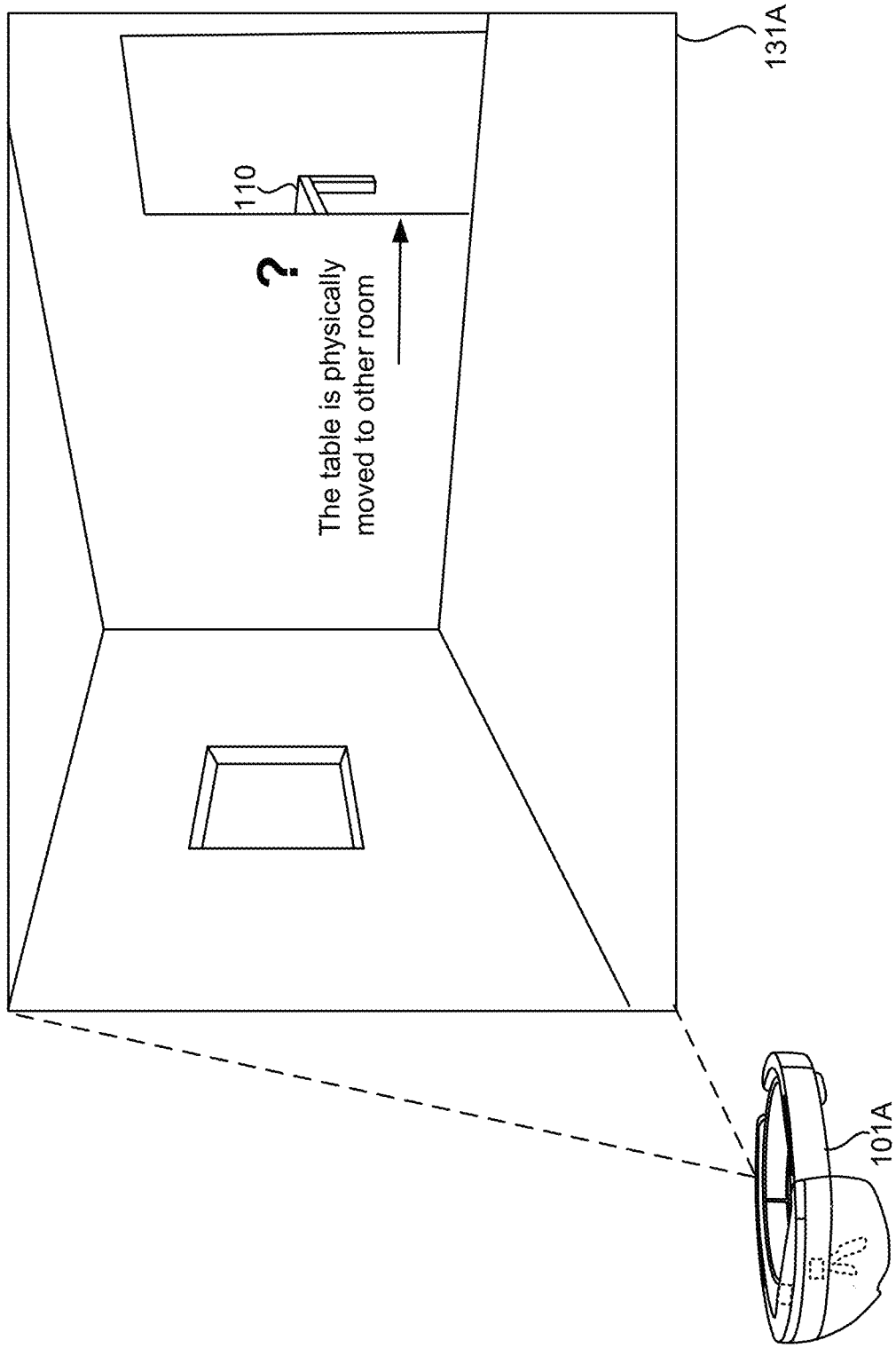
FIG. 5 illustrates a view displayed to a user utilizing a computing device for tracking the movement of a real-world object from a first room to a second room in a real-world environment.

The virtual object is associated with the table such that when the table is moved, the cup moves in a corresponding manner. As shown in FIG. 4, when the table is physically moved to the right, the cup moves with the table such that the cup is maintained at the same position relative to the table, e.g., on top. However, as shown in FIG. 5, as the table moves out of the viewing area of the first computing device 101A, sensors of the first computing device 101A may not be able to determine the position of the real-world object 110. In such a scenario, the rendering of the virtual object 111 may not accurately portray the graphical association between the two items.

Figure 6:
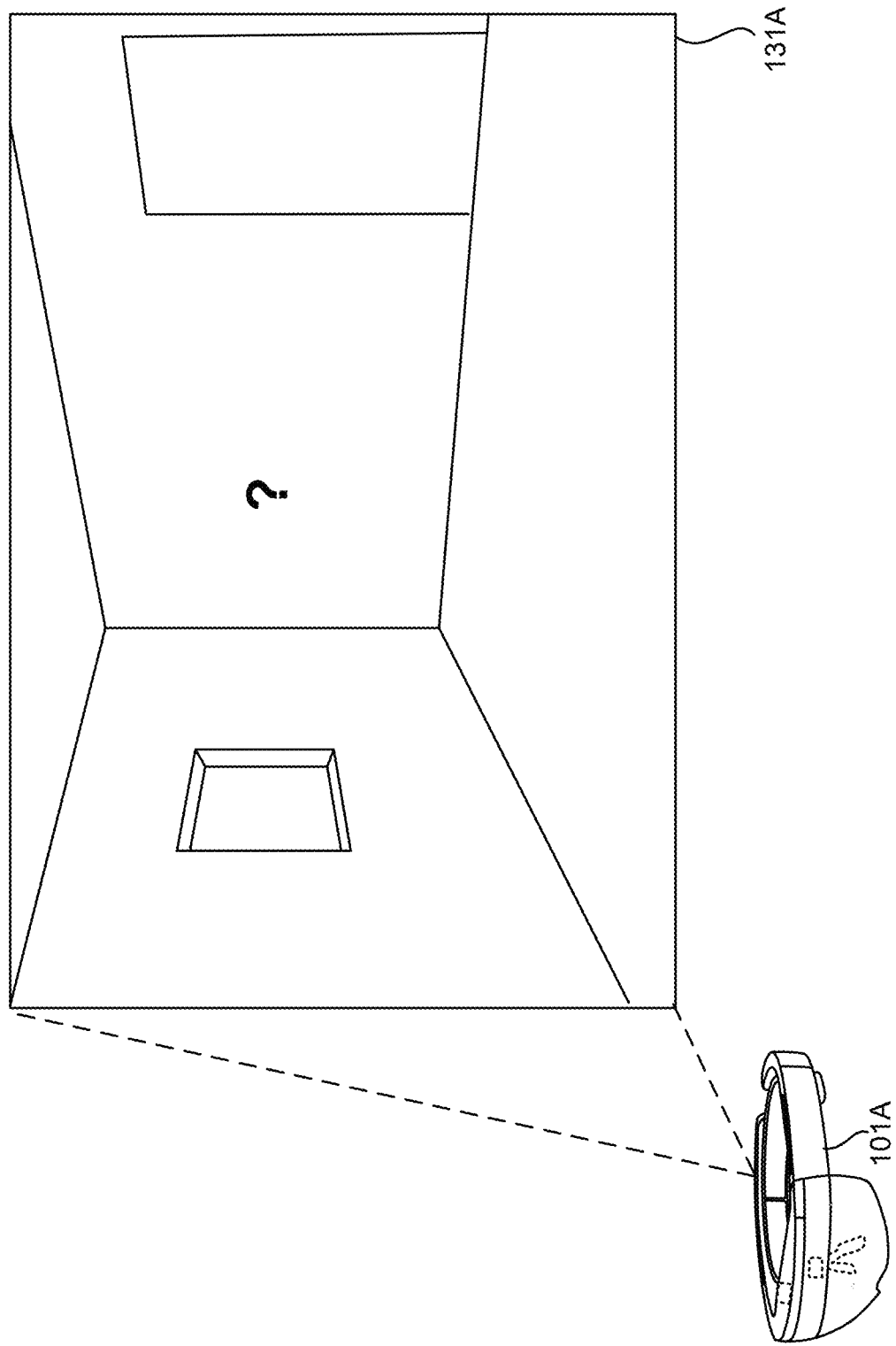
FIG. 6 illustrates a view displayed to a user utilizing a computing device for tracking the movement of a real-world object, the view showing a scenario where a wall is blocking a direct view of the real-world object.

As shown in FIG. 6, when the table is outside the viewing area 121A of the first computing device 101A, the first computing device 101A cannot accurately determine a position for the table, and thus cannot accurately position a rendering of the virtual object 111. As the real-world object moves outside of the viewing area 121A of the first computing device 101A to a threshold level, the first computing device 101A may generate event data indicating when the real-world object 110 is outside the viewing area 121A of the first computing device 101A.

The generation of event data can be based on a number of factors. For instance, the first computing device 101A can determine that the real-world object 110 is outside the viewing area 121A when an image of the real-world object 110 becomes distorted or obscured to a threshold level. Thus, if the real-world object 110 is partially covered by another object to a threshold level, the first computing device may determine that the real-world object 110 is outside the viewing area 121A. In this example, as the wall of the room starts to cover the real-world object up to a threshold level, e.g., a quarter of the table, half of the table, or three quarters of the table, the first computing device 101A may determine that the real-world object 110 is outside the viewing area 121A of the first computing device 101A. Such a determination may also be made when a view of the real-world object becomes too blurry or too small.

In response to determining that the real-world object 110 is outside the viewing area 121A of the first computing device 101A, the first computing device 101A can initiate the communication of at least a portion of the metadata 105 to one or more remote computing devices, such as the second computing device 101B. The communication can comprise at least one of the association data 106, images 108, or the model data 109.

In some embodiments, predetermined actions within a communication session can cause a delivery of the metadata from the first computing device 101A to one or more remote computers, such as the second computing device 101B. For example, if a user within the collaborative environment makes a comment referencing the virtual object 111 or the real-world object 110, the first computing device 101A may send the metadata to one or more remote computers, such as the second computing device 101B. Thus, a user can say "I see the table" and in response the system can send the metadata 105 to the device of that user. The metadata can be used to verify the identity of the real-world object.

The metadata 105 can be sent to specific computing devices based on other factors. In one illustrative example, the first computing device 101A can communicate the metadata 105 to any computing device within a predetermined distance or any computing device within a predetermined region. In such an embodiment, the first computing device 101A may use a location device, such as a GPS device or a network device, to determine a position of the first computing device 101A. The first computing device 101A can also receive location information from other computing devices, such as the second computing device 101B. If it is determined that a particular computer is within a predetermined distance and/or if it is determined that a particular computer is within a predetermined region, which may include a geographical region or a particular area in a building, the metadata 105 can be sent to those computers meeting that criteria.

In other illustrative examples, the first computing device 101A can select remote computing devices for receiving the metadata 105 using at least one of preference data, compatibility data, or performance data. The preference data can include, for example, a list of computing devices established by a user or a computer. In the example shown in FIG. 1, the second computing device 101B may be on a preference file of the first computing device. In response to determining that the preference file includes the second computing device 101B, the first computing device 101A may communicate the metadata 105 to the second computing device.

The compatibility data may indicate specifications of one or more remote devices. For instance, a file on the first computing device may determine that the metadata 105 can be delivered to any remote computer that comprises a specific camera and a specific depth map sensor. In other illustrative examples, the first computing device may determine that the metadata can be delivered to any remote computer that has a camera of a certain type, brand-name, etc.

The performance data may indicate performance of one or more remote computing devices. For instance, a file on the first computing device may determine that the metadata can be delivered to any remote computer that has a microprocessor that can manage a threshold level of operations over a period of time. In other examples, the first computing device may determine that the metadata can be delivered to any remote computing device that has a camera capable of capturing images having a threshold resolution level.

Once a remote computer, such as the second computing device 101B, receives the metadata 105, the remote computer can utilize the metadata 105 and other contextual data to determine when the real-world object 110 comes within the viewing area 121B of the second computing device 101B.

Figure 7:
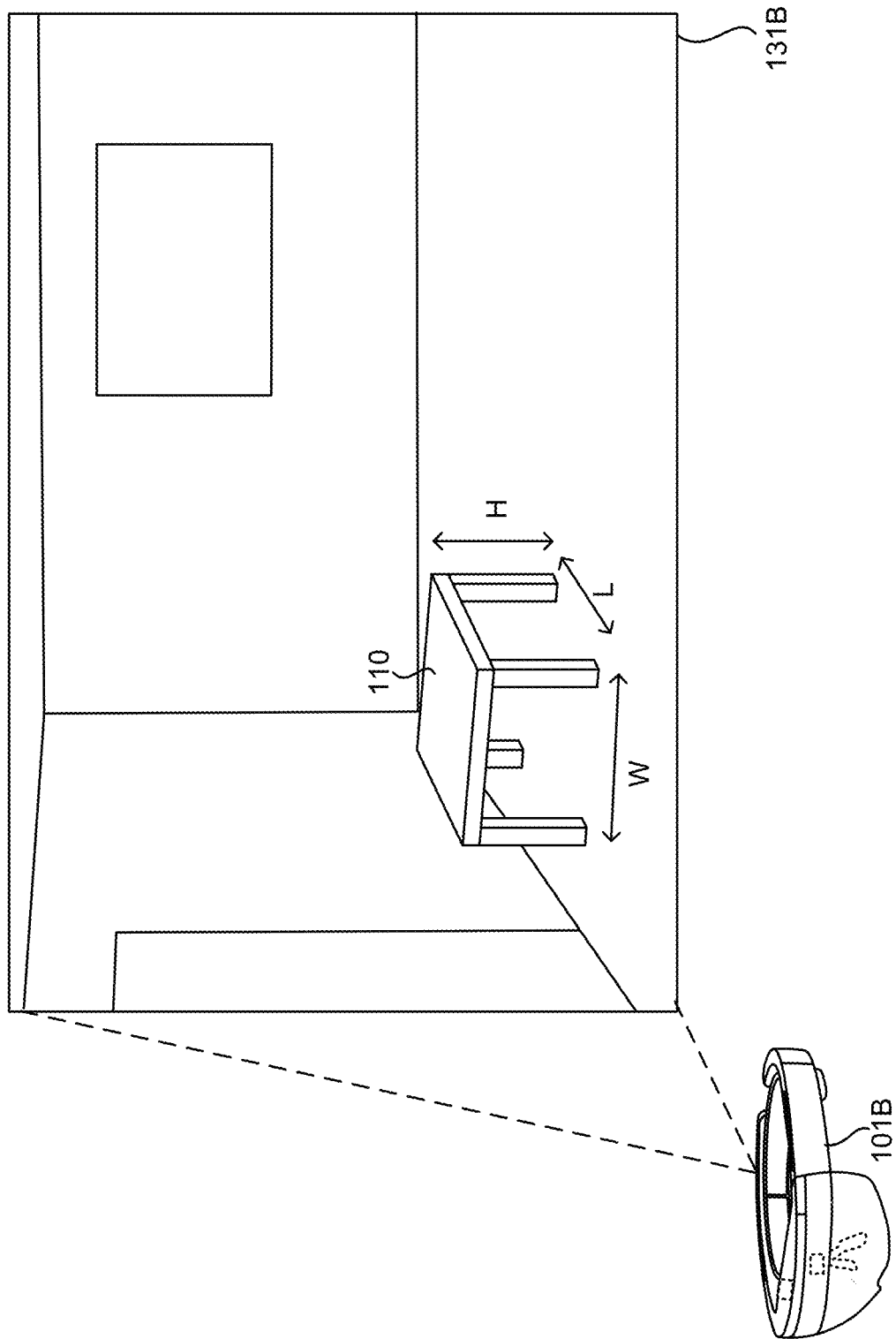
FIG. 7 illustrates a view displayed to a user utilizing a remote computing device for tracking the movement of a real-world object, wherein the tracking involves the detection of one or more characteristics of the real-world object.

As shown in FIG. 7, when the real-world object 110 comes into the viewing area 121B of the second computing device 101B, the second computing device 101B can utilize sensor data to identify physical characteristics of the real-world object 110 within the viewing area 121B. Any suitable physical characteristic can be measured, such as a height (H), width (W), and length (L), of the real-world object 110. The characteristics obtained by the second computing device can be used to determine if the real-world object in the viewing area 121B is the same, e.g., matches, the real-world object that was observed in the viewing area 121A of the first computing device 101A.

One or more techniques for determining a match, as described above, can be utilized. A physical characteristic of a real-world object may be assigned a value or a score. A match may be determined when a value of the physical characteristic of the real-world object within the viewing area 121B of the second computing device 101B is within a threshold difference of a value of at least one characteristic of the real-world object detected by the sensor of a remote computing device, e.g., the real-world object within the viewing area 121A of the first computing device 101A.

Figure 8:
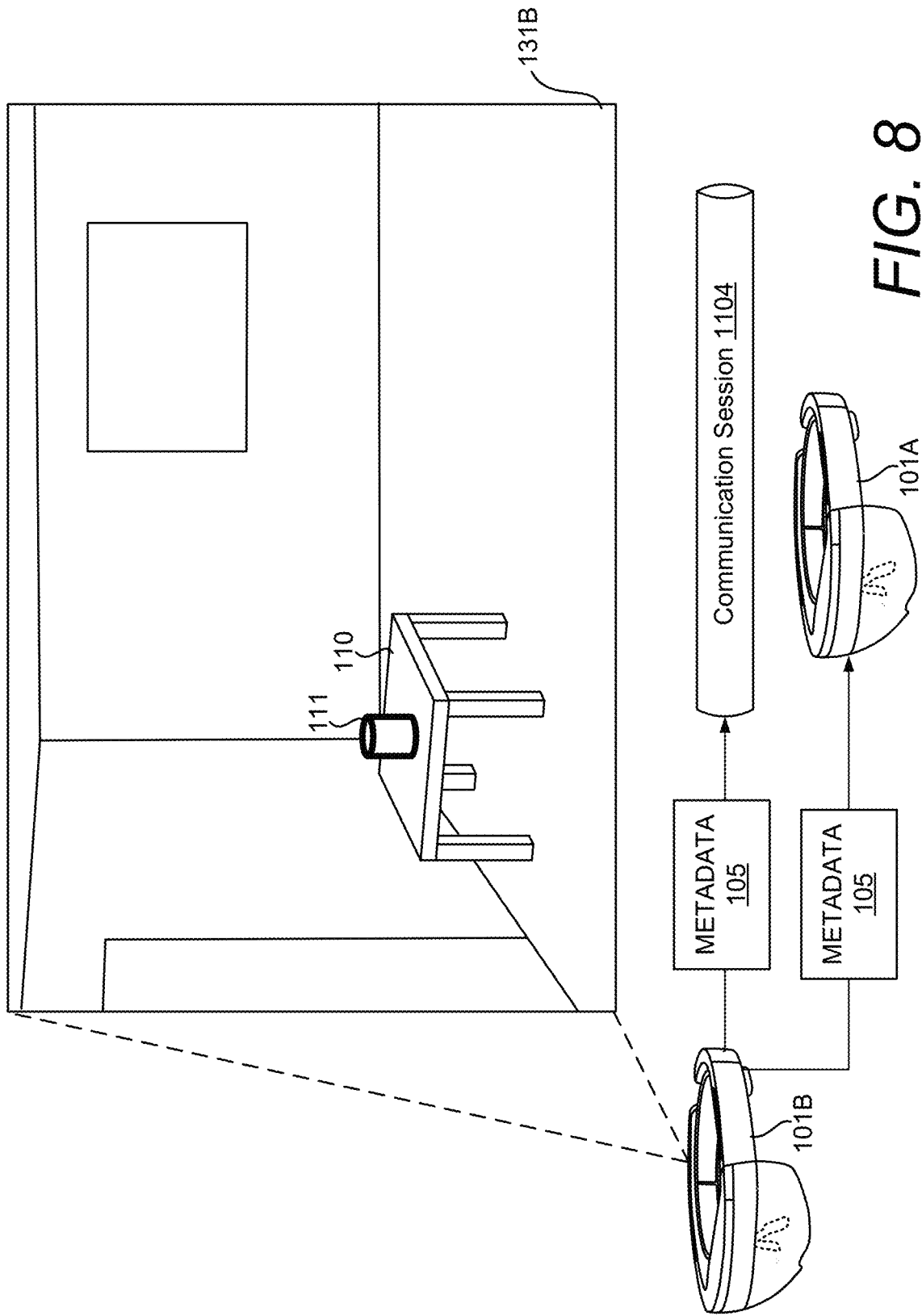
FIG. 8 illustrates a view displayed to a user utilizing a remote computing device for tracking the movement of a real-world object, where the remote computing device shares metadata with another computing device to coordinate tracking of the real-world object.

Once a match is detected, as shown in FIG. 8, the virtual object 111 is rendered within the viewing perspective 131B for display to a user of the second computing device 101B. The second computing device may utilize the association data 106 to determine a position for the rendering of the virtual object 111, which may be at a particular position relative to a position of the real-world object 110.

In one illustrative embodiment, the association data 106 may define a particular point within a surface of the real-world object 110. For example, the association data 106 may include coordinates defining a particular point on the top of the table, such as the center of the table. In addition, the association data 106 can indicate a point or a surface of the virtual object 111. For example, the association data may include coordinates defining the bottom of the cup. Such data can be utilized by the second computing device 101B to render the virtual object 111 and position it in a particular position relative to the real-world object 110.

This graphical association (also referred to herein as a "visual association") between the real-world object 110 and the virtual object 111 can be maintained as the real-world object 110 moves to different positions. For instance, the table can be moved from a first position within room 2 to a second position within room 2. While the real-world object 110 remains in a viewing area of the second computing device, the second computing device can move the virtual object 111 to maintain the same graphical association between the objects regardless of the position of the real-world object 110.

Also shown in FIG. 8, once the real-world object 110 is identified by the second computing device 101B, the second computing device 101B can send metadata 105, e.g., updated metadata 105, back to the first computing device 101A. The updated metadata 105 can include updates to any one of the association data 106, one or more images 108, and/or model data 109. In one illustrative example, the model data 109 can include positioning data indicating a location of the virtual object 111 and/or a location of the real-world object 110. The positioning data can be in any suitable format, which may include the use of Global Positioning Data (GPS) or other coordinate-based data formats to indicate a three-dimensional location of the virtual object 111 and/or the location of the real-world object 110. The updates may be sent to the first computing device 101A or other computing devices periodically. The updates may also be sent in response to a particular action, e.g., that the virtual object 111 has been moved or modified, or that the real-world object 110 has been moved.

In a collaborative environment, if a number of computers are in communication with the second computing device 101B, updates to the metadata 105 can be sent to each of the computers in response to a particular action, such as a modification to, or movement of, the virtual object 111. The updates to the metadata 105 can also be sent to the other computers in response to other user actions. For example, a computing device can monitor the communication of a collaborative environment, e.g., a communication session where multiple people are sharing video streams, audio streams, text communication, etc. The communication can be analyzed to determine one or more keywords, such as a name of an object, a reference to an object, etc.

If a user within the collaborative environment makes a comment referencing the virtual object 111 or the real-world object 110, updates to the metadata 105 can also be sent to other computers, including the computers that either send or receive the communication data comprising the comment referencing the virtual object or the real-world object. In some embodiments, updates to the metadata 105 can also be shared with a computing device managing a communication session 1104. In such an embodiment, the updated metadata 105 can be sent to any number of computing devices that are participating in the communication session. The updates to the metadata 105 can include text descriptions summarizing any related communication. The computer receiving the text descriptions can display those descriptions as an annotation to the virtual object 111 or the real-world object 110.

Figure 9:
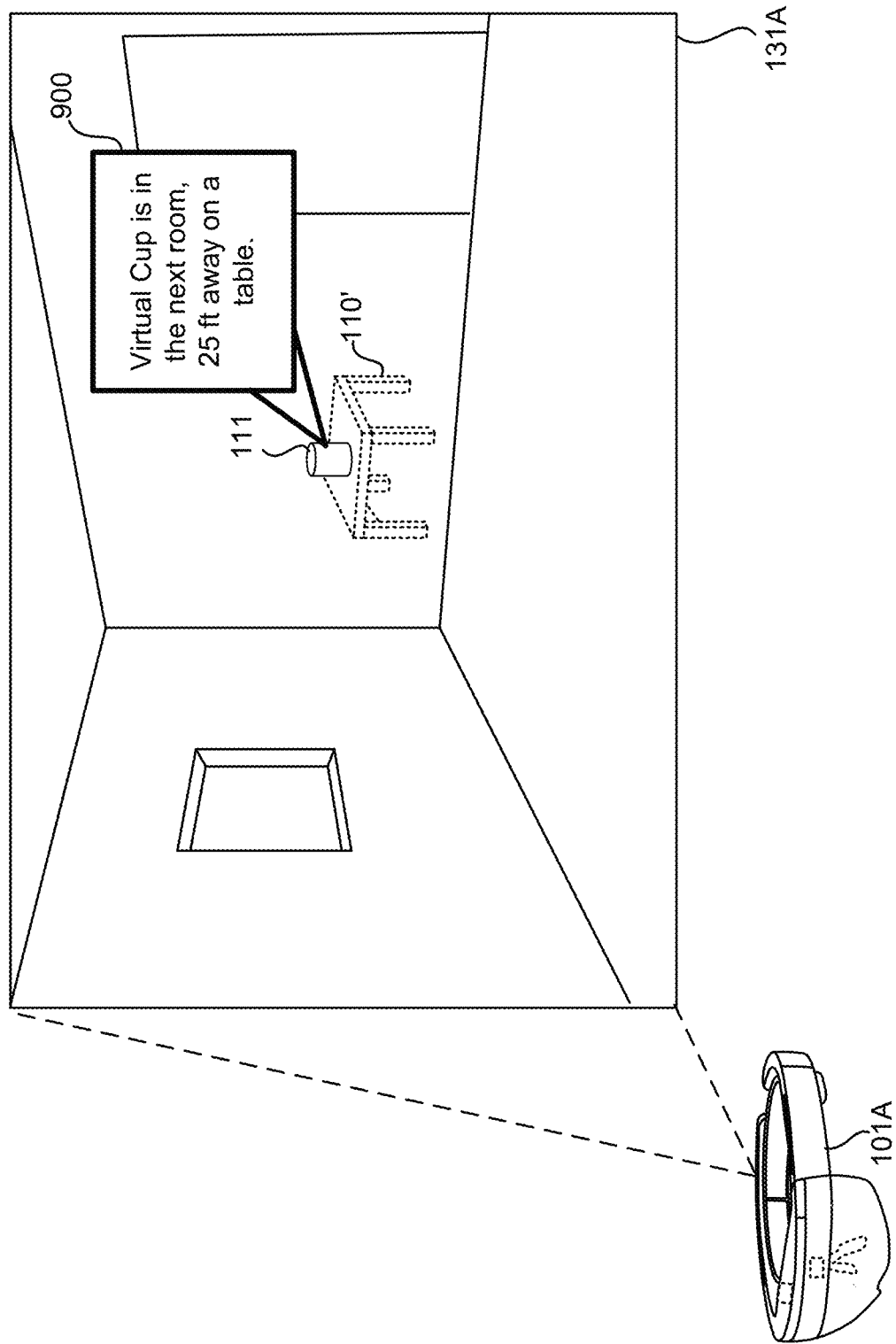
FIG. 9 illustrates a view displayed to a user utilizing a computing device for tracking the movement of a real-world object, where the computing device displays renderings based on the metadata shared from a remote computer tracking the location of the real-world object.

Any computing device receiving the updates to the metadata 105, such as the first computing device 101A, can then render the virtual object 111 according to the updated metadata. As shown in FIG. 9, the virtual object 111, the cup, is displayed within the first perspective view 131A of the first computing device 101A. In this example, the first computing device 101A also displays a graphical element 900 comprising aspects of the updated metadata 105. Specifically, in this example, the updated metadata 105 causes the first computing device 101A to display a graphical element 900 indicating that the virtual cup is in the next room, and that the virtual cup is at a specific distance from the first computing device 101A. This example is provided for illustrative purposes and is not to be construed as limiting. It can be appreciated that any information related to the virtual object or a real-world object may be communicated to the first computing device 101A or any other computing device, and that any annotation related to the objects maybe communicated and displayed.

In some embodiments, a computing device receiving updated metadata may also modify the display of the virtual object 111 to indicate a particular status, e.g., that the virtual object 111 is behind a wall or positioned at a particular distance. In this example, as shown in FIG. 9, the display of the virtual object 111 is slightly modified, e.g., rendered with a thinner outline, to indicate that the virtual object 111 is located at a particular distance or located behind a real-world object, such as a wall of a building.

Also shown in FIG. 9, a computing device, such as the first computing device 101A, receiving updated metadata 105 may also display a rendering 110' of the real-world object 110. This rendering allows users of a computing device, such as the first computing device 101A, to see the location of the real-world object 110 that has been moved out of the viewing area of the first computing device 101A. The rendering 110' of the real-world object may be at a position and scale that represents a location of the real-world object 110 that is detected by the second computing device 101B. The rendering 110' may be modified (e.g. rendered with dashed lines) to indicate that the real-world object is blocked or otherwise obscured in some manner.

In another aspect, a system can maintain an association between a real-world object and a virtual object between different communication sessions, e.g., online meetings or broadcasts. For example, in a group communication session using Skype, a first device can determine physical characteristics of real-world objects. Data defining the physical characteristics and other metadata defining virtual objects can be stored during or upon the conclusion of the communication session. The metadata can be stored in a remote computer, such as a server managing multiple communication sessions. When a new communication session is instantiated, e.g., a private chat, a device can use the stored data to identify a real-world object matching the physical characteristics and then display associated virtual objects that were created in the previous communication session.

Figure 10:
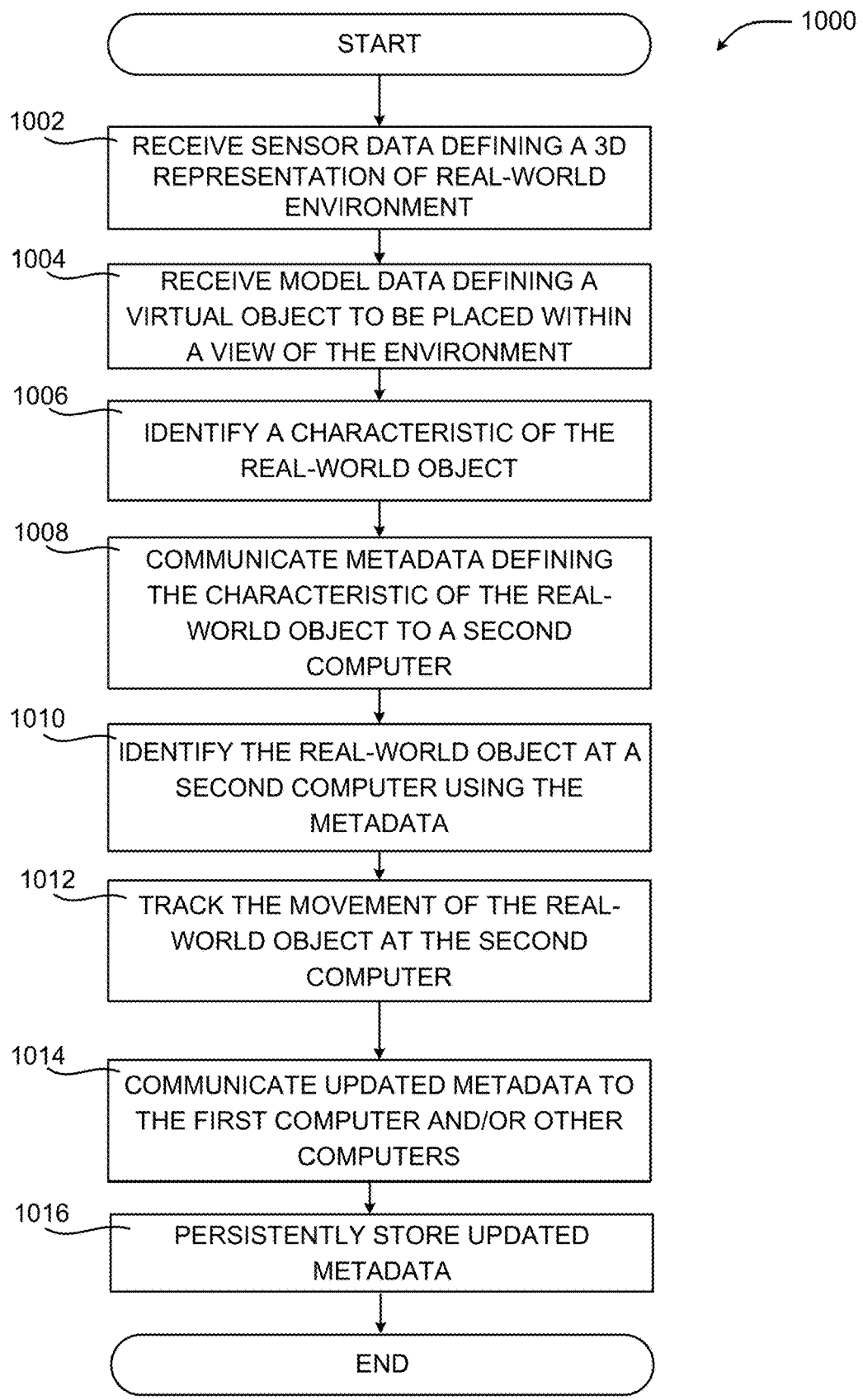
FIG. 10 is a flow diagram illustrating aspects of a routine for a computationally efficient process for tracking movement of real-world objects displayed within mixed-reality and virtual-reality collaborative environments.

FIG. 10 is a diagram illustrating aspects of a routine 1000 for computationally efficient management of data associated with objects that are displayed within mixed-reality and virtual-reality collaboration environments. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device 101, which can refer to either the first computing device 101A or the second computing device 101B, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGURES can be implemented in association with the example presentation user interface(s) (UI) described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 1000 begins at operation 1002, where the computing device 101 receives sensor data that defines a 3D representation of a real-world environment 112. The sensor data can be captured by a depth map sensor, e.g., a depth map camera. In addition, the sensor data can be captured by image sensor, e.g. a camera, where the depth map sensor and the image sensor can be part of the same component or in separate components. The sensor data comprises depth map data defining a three-dimensional model of a real-world environment and an image of the real-world environment. For instance, a real-world environment may include the walls of a room and a particular object within the room, such as the real-world object shown in FIG. 1. The sensor data can define physical properties of a plurality of real-world objects within the real-world environment. The sensor data also indicates a position of one or more objects within an environment. Thus, measurements of an object or measurements of the environment can be made by an analysis of the sensor data. One or more objects defined in the sensor data can be shared with the number of users participating in a collaborative environment. The collaborative environment can include a communication session that allows users to send, receive and view aspects of the sensor data rendered on a display device.

The routine 1000 then proceeds to operation 1002, where the computing device 101 receives model data defining one or more virtual objects to be displayed within a view of the collaborative environment. The model data can define specific positions where the virtual objects are to be placed within a user interface of the collaborative environment.

At operation 1006, the computing device 101 can identify at least one characteristic of the real-world object. In some embodiments, operation 1006 can include identification of a physical feature or a measurement of the real-world object. Characteristics such as the shape, size, texture, color, or any other identifiable characteristic can be captured by one or more sensors of the computing device. The characteristics may also include other markings such as handwritten text, symbols, barcodes, etc.

Next, at operation 1008, the computing device 101 can communicate metadata 105 defining the characteristic to one or more remote computers. The characteristics of the real-world object may be stored in the association data 106. The association data 106 can cause a remote computer to readily identify the real-world object by the use of the characteristics.

In some configurations, the metadata 105 can be sent to a remote computer in response to a particular event. For example, the metadata 105 can be communicated to other computing devices when the real-world object is moved out of the viewing area 121A of the computing device 101, or if the view of the real-world object is obscured at least partially.

In some configurations, the metadata 105 can be sent to a remote computer in response to determining that the remote computer meets one or more criteria with respect to a hardware compatibility. In such embodiments, the first computing device 101A may receive contextual data indicating specifications of one or more components, i.e., sensors, of the remote computing device. For instance, the second computing device 101B and other computers may send contextual data indicating that the second computing device 101B has a sensor with a particular resolution, or a camera with a particular light sensitivity, or a particular model number of a depth map sensor.

The first computing device 101A may select the remote computing device from a plurality of computing devices when the specifications (hardware specifications or performance specifications) of the one or more components of the remote computing device meet one or more criteria. The first computing device 101A may then communicate the metadata defining the at least one characteristic of the real-world object to a particular remote computing device having one or more components that meets the criteria. This embodiment enables efficient communication of the metadata and only sends the metadata to computing devices that have sensors or other components that are capable of performing the techniques disclosed herein.

Next, at operation 1010, a computing device 101, such as the second computing device 101B, can receive the metadata 105 and identify the real-world object. As described herein, the second computing device 101B can identify the real-world object is a match to the real-world object observed by the first computing device 101A, if one or more characteristics match within a threshold level.

In some embodiments, the computing device 101 may determine that a first value of the physical characteristic of the real-world object within the viewing area is within a threshold difference of a second value of the at least one physical characteristic of the real-world object viewed by the sensor of a remote computing device. In such embodiments, the first computing device 101A can associate a first value, e.g., a first score, with one or more characteristics, such as a color, size, measurement, texture, etc. This first value can be based on data generated from one or more sensors (of the first computing device) capturing an image or depth map image of the object before it is moved from its original location, as shown in FIG. 1.

After the object is moved into the viewing area of the second computing device 101B, e.g., into the viewing area of a sensor of the second computing device 101B, the second computing device can associate a second value, e.g., a second score, with one or more characteristics, such as a color, size, measurement, etc. The second value can be based on data generated from one or more sensors (of the second computing device) capturing an image or depth map image of the object after it is moved from its original location, as shown in FIG. 1.

Any suitable value or score can be associated with a characteristic. For instance, individual colors of a spectrum of colors can each be associated with a score. A light red color may be associated with a score of 1, a dark red color may be associated with a score of 2, a light green color may be associated with a score of 5, and a dark green color may be associated with a score of 6. Thus, when each computing device interprets a view of a real-world object, they may use such values to determine if the characteristics match within a threshold. Thus, even if the second computing device identifies the color is a light green and the first computing device identifies the color as a dark green, the two computing devices may identify a match according to the techniques disclosed herein. Other characteristics such as lengths, textures, and other measurements can be scored in a similar way and use other corresponding threshold values.

The computing devices can compare the first value against the second value. In response to determining that the first value and the second value are within a threshold difference, the second computing device can take one more actions. For instance, the second computing device can render the virtual object on a display device at a position relative to a display of the real-world object within the viewing area of the second computing device 101B. As other example, the second computing device 101B can start to track the location or movement of the real-world object.

At operation 1012, a computing device, such as the second computing device 101B, can track the movement of the real-world object. As illustrated in the figures and described above, the second computing device 101B can render the virtual object in a particular location relative to the real-world object based on the metadata. The second computing device 101B can track the movement of the real-world object and correspondingly move the location of the virtual object to maintain a graphical association between the two items.

At operation 1014, a computing device, such as the second computing device 101B, and the updated metadata 105 can be communicated to other computers, including the first computing device 101A. The updated metadata 105 can allow the other computers to display a rendering of the virtual object using an updated location and/or augmentations made to the virtual object. The updated metadata 105 can also cause a computing device to display annotations or comments made in relation to the virtual object. At operation 1016, the updated metadata can also be stored persistently to enable one or more computing devices to utilize the updated metadata and other communication sessions, subsequent to which the routine 1000 ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
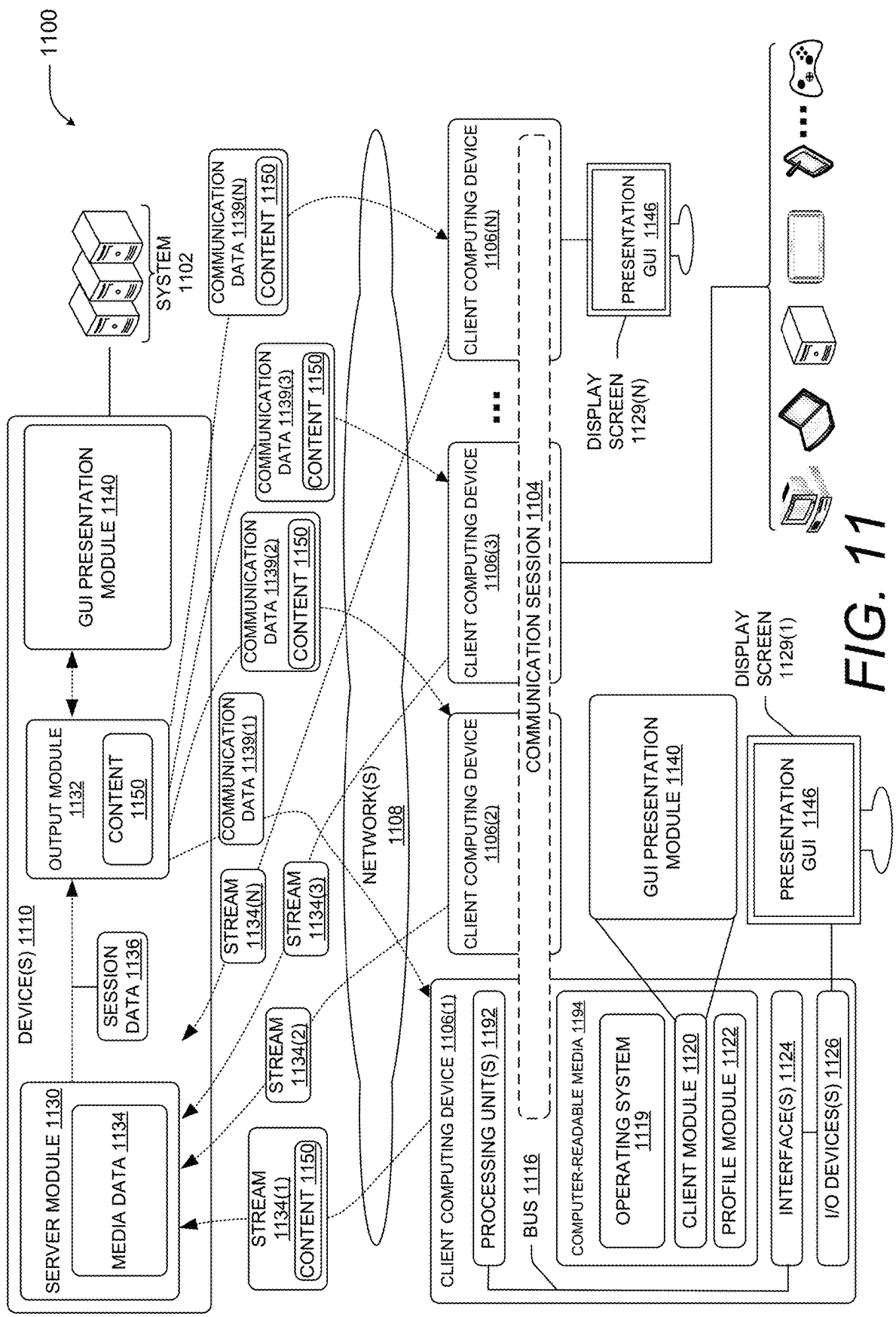
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 may function to collect, analyze, and share data defining one or more objects that are displayed to users of a communication session 1004.

As illustrated, the communication session 1104 may be implemented between a number of client computing devices 1106(1) through 1106(N) (where N is a number having a value of two or greater) that are associated with the system 1102 or are part of the system 1102. The client computing devices 1106(1) through 1106(N) enable users, also referred to as individuals, to participate in the communication session 1104. For instance, the first client computing device 1106(1) may be one of the computing devices 101 of FIG. 1 or computing device 1300 of FIG. 13.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent configured to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras.

For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live and/or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live and/or recorded content within the communication data enable a remote meeting to be facilitated between a group of people and the sharing of content within the group of people. In some implementations, the various streams of live and/or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee of a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1192 operably connected to computer-readable media 1194 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1129(1)), which can display a UI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all of the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1139 to the client computing devices (e.g., client computing devices 1106(1) through 1106(N) participating in a live viewing of the communication session). The communication data 1139 may include video, audio, and/or other content data, provided by the output module 1132 based on content 1150 associated with the output module 1132 and based on received session data 1136.

As shown, the output module 1132 transmits communication data 1139(1) to client computing device 1106(1), and transmits communication data 1139(2) to client computing device 1106(2), and transmits communication data 1139(3) to client computing device 1106(3), etc. The communication data 1139 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1139 that is for delivery to one or more of the client computing devices 1106. Specifically, the UI presentation module 1140, at the device(s) 1110 and/or the client computing device 1106, may analyze communication data 1139 to determine an appropriate manner for displaying video, image, and/or content on the display screen 1129 of an associated client computing device 1106. In some implementations, the GUI presentation module 1140 may provide video, images, and/or content to a presentation GUI 1146 rendered on the display screen 1129 of the associated client computing device 1106. The presentation GUI 1146 may be caused to be rendered on the display screen 1129 by the GUI presentation module 1140. The presentation GUI 1146 may include the video, images, and/or content analyzed by the GUI presentation module 1140.

In some implementations, the presentation GUI 1146 may include a plurality of sections or grids that may render or comprise video, image, and/or content for display on the display screen 1129. For example, a first section of the presentation GUI 1146 may include a video feed of a presenter or individual, and a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
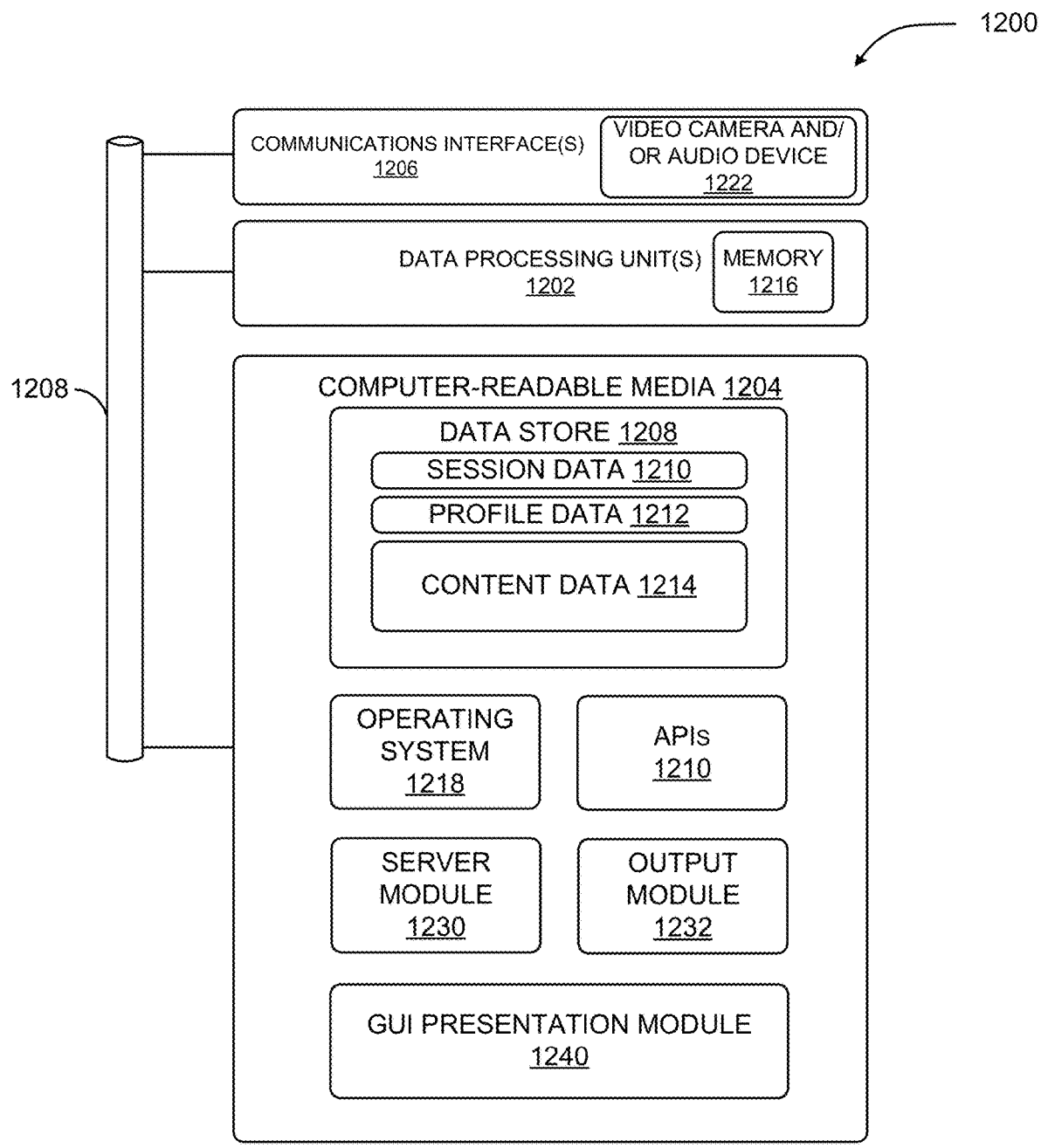
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device") configured to generate data for some of the user interfaces disclosed herein. The device 1200 may generate data that may include one or more sections that may render or comprise video, images, virtual objects 116, and/or content for display on the display screen 1129. The device 1200 may represent one of the device(s) described herein. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus 1208, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1192, may represent, for example, a CPU-type data processing unit, a GPU-type data processing unit, a field-programmable gate array ("FPGA"), another class of digital signal processors ("DSPs"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1210, profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content that includes video, audio, or other content for rendering and display on one or more of the display screens 1129.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

Figure 13:
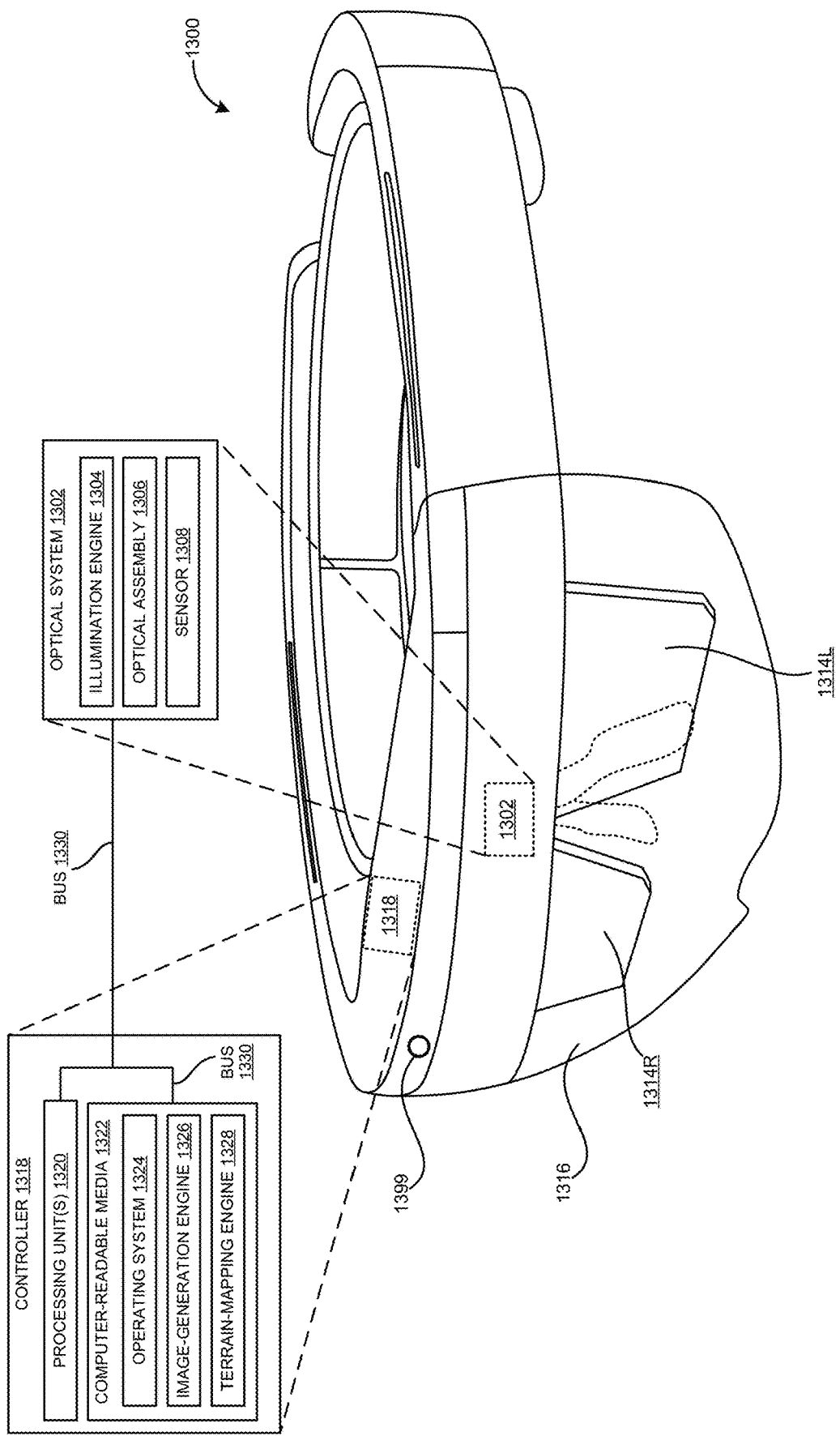
FIG. 13 is a computing device diagram showing aspects of the configuration and operation of an AR device that can implement aspects of the disclosed technologies, according to one embodiment disclosed herein.

FIG. 13 is a computing device diagram showing aspects of the configuration and operation of a computing device 1300 that can implement aspects of the systems disclosed herein. The computing device 1300 shows details of the computing device 101 shown in FIG. 1. The computing device 1300 can provide augmented reality ("AR") environments or virtual reality ("VR") environments. Generally described, AR environments superimpose computer-generated ("CG") images over a user's view of a real-world environment. For example, a computing device 1300 can generate composite views to enable a user to visually perceive a computer-generated image superimposed over a rendering of a real-world environment 112, wherein the rendering of the real-world environment 112 can be displayed using image data of a sensor 1399, e.g., a depth map sensor or camera, directed toward the real-world environment 112, such as a room. In some embodiments, a computing device 1300 can generate composite views to enable a user to visually perceive a computer-generated image superimposed over a direct view of a real-world environment 112. Thus, the computing device 1300 may have a prism or other optical device that allows a user to see through the optical device to see a direct view of a real-world object or a real-world environment, and at the same time, a computer-generated image superimposed over that view of a real-world object. An AR environment can also be referred to herein as a mixed reality ("MR") environment. A VR environment includes computer-generated images of a virtual environment and virtual objects. MR and AR environments can utilize depth map sensors to determine a distance between the device and a real-world object. This allows the computer to scale and position a computer-generated graphic over an image of a real-world object in a realistic manner.

In the example shown in FIG. 13, an optical system 1302 includes an illumination engine 1304 to generate electromagnetic ("EM") radiation that includes both a first bandwidth for generating CG images and a second bandwidth for tracking physical objects. The first bandwidth may include some or all of the visible-light portion of the EM spectrum whereas the second bandwidth may include any portion of the EM spectrum that is suitable to deploy a desired tracking protocol. In this example, the optical system 1302 further includes an optical assembly 1306 that is positioned to receive the EM radiation from the illumination engine 1304 and to direct the EM radiation (or individual bandwidths thereof) along one or more predetermined optical paths.

For example, the illumination engine 1304 may emit the EM radiation into the optical assembly 1306 along a common optical path that is shared by both the first bandwidth and the second bandwidth. The optical assembly 1306 may also include one or more optical components that are configured to separate the first bandwidth from the second bandwidth (e.g., by causing the first and second bandwidths to propagate along different image-generation and object-tracking optical paths, respectively).

In some instances, a user experience is dependent on the computing device 1300 accurately identifying characteristics of a physical object or plane (such as the real-world floor) and then generating the CG image in accordance with these identified characteristics. For example, suppose that the computing device 1300 is programmed to generate a user perception that a virtual gaming character is running towards and ultimately jumping over a real-world structure. To achieve this user perception, the computing device 1300 might obtain detailed data defining features of the real-world environment 112 around the computing device 1300. In order to provide this functionality, the optical system 1302 of the computing device 1300 might include a laser line projector and a differential imaging camera (both not shown in FIG. 13) in some embodiments.

In some examples, the computing device 1300 utilizes an optical system 1302 to generate a composite view (e.g., from a perspective of a user that is wearing the computing device 1300) that includes both one or more CG images and a view of at least a portion of the real-world environment 112. For example, the optical system 1302 might utilize various technologies such as, for example, AR technologies to generate composite views that include CG images superimposed over a real-world view. As such, the optical system 1302 might be configured to generate CG images via an optical assembly 1306 that includes a display panel 1314.

In the illustrated example, the display panel includes separate right eye and left eye transparent display panels, labeled 1314R and 1314L, respectively. In some examples, the display panel 1314 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment 112 passes through the see-through display panel 1314 to the eye or eyes of the user. Graphical content computed by an image-generation engine 1326 executing on the processing units 1320 and displayed by right-eye and left-eye display panels, if configured as see-through display panels, might be used to visually augment or otherwise modify the real-world environment 112 viewed by the user through the see-through display panels 1314. In this configuration, the user is able to view virtual objects that do not exist within the real-world environment 112 at the same time that the user views physical objects (also referred to herein as "real-world objects") within the real-world environment 112. This creates an illusion or appearance that the virtual objects are physical objects or physically present light-based effects located within the real-world environment 112.

In some examples, the display panel 1314 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the computing device 1300 further includes an additional see-through optical component, shown in FIG. 13 in the form of a transparent veil 1316 positioned between the real-world environment 112 and the display panel 1314. It can be appreciated that the transparent veil 1316 might be included in the computing device 1300 for purely aesthetic and/or protective purposes.

The computing device 1300 might further include various other components (not all of which are shown in FIG. 13), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver, a laser line projector, a differential imaging camera, and, potentially, other types of sensors. Data obtained from one or more sensors 1308, some of which are identified above, can be utilized to determine the orientation, location, and movement of the computing device 1300. As discussed above, data obtained from a differential imaging camera and a laser line projector, or other types of sensors, can also be utilized to generate a 3D depth map of the surrounding real-world environment 112.

In the illustrated example, the computing device 1300 includes one or more logic devices and one or more computer memory devices storing instructions executable by the logic device(s) to implement the functionality disclosed herein. In particular, a controller 1318 can include one or more processing units 1320, one or more computer-readable media 1322 for storing an operating system 1324, an image-generation engine 1326 and a terrain-mapping engine 1328, and other programs (such as a 3D depth map generation module configured to generate the mesh data) in the manner disclosed herein), and data.

In some implementations, the computing device 1300 is configured to analyze data obtained by the sensors 1308 to perform feature-based tracking of an orientation of the computing device 1300. For example, in a scenario in which the object data includes an indication of a stationary physical object (also referred to herein as a "real-world object") within the real-world environment 112 (e.g., a table), the computing device 1300 might monitor a position of the stationary object within a terrain-mapping field-of-view ("FOV"). Then, based on changes in the position of the stationary object within the terrain-mapping FOV and a depth of the stationary object from the computing device 1300, a terrain-mapping engine executing on the processing units 1320 might calculate changes in the orientation of the computing device 1300.

It can be appreciated that these feature-based tracking techniques might be used to monitor changes in the orientation of the computing device 1300 for the purpose of monitoring an orientation of a user's head (e.g., under the presumption that the computing device 1300 is being properly worn by a user). The computed orientation of the computing device 1300 can be utilized in various ways, some of which have been described above.

The processing unit(s) 1320, can represent, for example, a central processing unit ("CPU")-type processor, a graphics processing unit ("GPU")-type processing unit, an FPGA, one or more digital signal processors ("DSPs"), or other hardware logic components that might, in some instances, be driven by a CPU. For example, and without limitation, illustrative types of hardware logic components that can be used include ASICs, Application-Specific Standard Products ("ASSPs"), System-on-a-Chip Systems ("SOCs"), Complex Programmable Logic Devices ("CPLDs"), etc. The controller 1318 can also include one or more computer-readable media 1322, such as the computer-readable media described above.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
one or more data processing units; and
a computer-readable medium having encoded thereon computer-executable instructions to cause the one or more data processing units to
receive sensor data generated by a depth map sensor, the sensor data comprising depth map data defining a three-dimensional model of a real-world object within a viewing area of the system;
receive model data defining a virtual object, the model data causing the system to display a rendering of the virtual object concurrently with a display of the real-world object;
identify at least one characteristic of the real-world object based on an analysis of the sensor data;
communicate metadata defining the at least one characteristic of the real-world object to a remote computing device, the metadata causing the remote computing device to track a movement of the real-world object within a viewing area of the remote computing device using the at least one characteristic to identify the real-world object, wherein the remote computing device generates updated metadata indicating the movement of the real-world object within the viewing area of the remote computing device; and receiving the updated metadata from the remote computing device, the updated metadata indicating the movement of the real-world object within the viewing area of the remote computing device; and displaying an updated rendering of the virtual object at a new position based on the metadata indicating the movement of the real-world object.

2. The system of claim 1, wherein the instructions further cause the one or more data processing units to determine that the real-world object is outside of the viewing area of the system; and in response to determining that the real-world object is outside the viewing area of the system, communicating the metadata defining the at least one characteristic of the real-world object to the remote computing device.

3. The system of claim 2, wherein the real-world object is determined to be outside of the viewing area of the system when image data generated by an imaging camera directed toward the real-world object indicates that an image of the real-world object is distorted or obscured at a threshold level.

4. The system of claim 1, wherein the instructions further cause the one or more data processing units to determine a distance between the system and individual computing devices of a plurality of computing devices;

select the remote computing device from a plurality of computing devices when a distance between the system and the remote computing device is within a threshold distance; and communicate the metadata defining the at least one characteristic of the real-world object to the remote computing device.

5. The system of claim 1, wherein the instructions further cause the one or more data processing units to receive location data indicating a location of the remote computing device;

determine that the remote computing device is within a predetermined region; and in response to determining that the remote computing device is within a predetermined region, communicate the metadata defining the at least one characteristic of the real-world object to the remote computing device.

6. The system of claim 1, wherein the instructions further cause the one or more data processing units to analyze one or more streams of a communication session to identify a reference to the real-world object;

select the remote computing device from a plurality of computing devices when the remote computing device transmits one or more streams indicating keywords that reference the real-world object;

communicate the metadata defining the at least one characteristic of the real-world object to the remote computing device in response to determining that the one or more streams from the remote computing device indicate keywords that reference the real-world object.

7. The system of claim 1, wherein the instructions further cause the one or more data processing units to receive contextual data indicating specifications of one or more sensors of the remote computing device;

select the remote computing device from a plurality of computing devices when the specifications of the one or more components of the remote computing device meet one or more criteria;

communicate the metadata defining the at least one characteristic of the real-world object to the remote computing device in response to determining that the specifications of the one or more components of the remote computing device meet the one or more criteria.

8. The system of claim 1, wherein the instructions further cause the one or more data processing units to receive contextual data indicating performance specifications of one or more sensors of the remote computing device;

select the remote computing device from a plurality of computing devices when the performance specifications of the one or more sensors of the remote computing device meet one or more criteria;

communicate the metadata defining the at least one characteristic of the real-world object to the remote computing device in response to determining that the performance specifications of the one or more sensors of the remote computing device meet the one or more criteria.

9. A method comprising:

receiving, at a computing device, metadata defining at least one characteristic of a real-world object, wherein the at least one characteristic is detected by a sensor of a remote computing device, the metadata further comprising model data defining a virtual object, and association data defining a position of the virtual object relative to the real-world object;

receiving, at the computing device, sensor data generated by a depth map sensor of the computing device, the sensor data comprising depth map data defining a three-dimensional model of the real-world object within a viewing area of the depth map sensor of the computing device;

determining a first value of a physical characteristic of the real-world object within the viewing area of the depth map sensor of the computing device, the first value of the physical characteristic determined by an analysis of the sensor data;

determining that the first value of the physical characteristic of the real-world object within the viewing area is within a threshold difference of a second value of the at least one characteristic of the real-world object detected by the sensor of the remote computing device; and in response to determining that the first value and the second value are within the threshold difference, track a location of the real-world object using the depth map sensor, and render the virtual object on a display device at a position relative to a display of the real-world object that is based on the location.

10. The method of claim 9, further comprising:

tracking a movement of the real-world object within the viewing area by the use of the depth map sensor to determine a new location of the real-world object within the viewing area; and communicating updated metadata to the remote computing device, the updated metadata causing the remote computing device to display a rendering of the real-world object wherein the rendering indicates the new location.

11. The method of claim 9, further comprising:

tracking the movement of the real-world object within the viewing area by the use of the depth map sensor to determine a new location of the real-world object within the viewing area; and communicating updated metadata to the remote computing device, the updated metadata causing the remote computing device to display a rendering of the virtual object at a position that is based on the new location of the real-world object.

12. The method of claim 9, wherein the first value of the physical characteristic indicates a first measurement of at least one dimension of the real-world object that is detected by the depth map sensor of the computing device, and wherein the second value of the at least one characteristic indicates a second measurement of the at least one dimension of the real-world object that is detected by the sensor of the remote computing device.

13. The method of claim 9, wherein the first value of the physical characteristic indicates a first measurement of at least one color of the real-world object that is detected by a camera of the computing device, and wherein the second value of the at least one characteristic indicates a second measurement of the at least one color of the real-world object that is detected by a camera of the remote computing device.

14. The method of claim 9, wherein the first value of the physical characteristic indicates a first measurement of a shape of the real-world object that is detected by a camera of the computing device, and wherein the second value of the at least one characteristic indicates a second measurement of the shape of the real-world object that is detected by a camera of the remote computing device.

15. The method of claim 9, wherein the first value of the physical characteristic indicates a first measurement of a surface texture of the real-world object that is detected by a camera of the computing device, and wherein the second value of the at least one characteristic indicates a second measurement of the surface texture of the real-world object that is detected by a camera of the remote computing device.

16. A system comprising:
means for receiving, at the system, sensor data generated by a depth map sensor, the sensor data comprising depth map data defining a three-dimensional model of a real-world object within a viewing area of the system;
means for receiving model data defining a virtual object for displaying a rendering of the virtual object concurrently with a display of the real-world object;
means for identifying at least one characteristic of the real-world object based on an analysis of the sensor data;
means for communicating metadata defining the at least one characteristic of the real-world object to a remote computing device, the metadata causing the remote computing device to track a movement of the real-world object within the viewing area of the remote computing device using the at least one characteristic to identify the real-world object; and
receiving updated metadata from the remote computing device indicating the movement of the real-world object within the viewing area of the remote computing device, and displaying an updated rendering of the virtual object based on the metadata indicating the movement of the real-world object.

17. The system of claim 16, wherein the system further comprises:
means for determining that the real-world object is outside of the viewing area of the system; and
in response to determining that the real-world object is outside the viewing area of the system, utilizing a means for communicating the metadata defining the at least one characteristic of the real-world object.

18. The system of claim 17, wherein the real-world object is determined to be outside of the viewing area of the system when image data generated by an imaging camera directed toward the real-world object indicates that an image of the real-world object is distorted or obscured at a threshold level.

19. The system of claim 16, wherein the system further comprises:
means for determining a distance between the system and individual computing devices of a plurality of computing devices;
means for selecting the remote computing device from a plurality of computing devices when a distance between the system and the remote computing device is within a threshold distance; and
utilizing a means for communicating the metadata defining the at least one characteristic of the real-world object to the remote computing device.

20. The system of claim 16, wherein the system further comprises: means for receiving location data indicating a location of the remote computing device; means for determining that the remote computing device is within a predetermined region; and
in response to determining that the remote computing device is within a predetermined region, utilizing a means for communicating the metadata defining the at least one characteristic of the real-world object to the remote computing device.

* * * * *